G. A. SCHLOTTER.

SHIP PROPELLER.

APPLICATION FILED MAY 15, 1911.

Reissued Jan. 2, 1912. 13,349.

Witnesses
L. J. Murphy
John Murtagh

Inventor
Georg Arthur Schlotter
by Geoffrey Gopel
his Attorneys.

COLUMBIA PLANOGRAPH CO., WASHINGTON, D. C.

UNITED STATES PATENT OFFICE.

GEORG ARTHUR SCHLOTTER, OF DRESDEN, GERMANY, ASSIGNOR TO SCHLOTTER-PROPELLER-PATENTVERWERTUNGS-GESELLSCHAFT MIT BESCHRÄNKTER HAFTUNG, OF DRESDEN, GERMANY.

SHIP-PROPELLER.

13,349. Specification of Reissued Letters Patent. Reissued Jan. 2, 1912.

Original No. 921,896, dated May 18, 1909, Serial No. 405,738. Application for reissue filed May 15, 1911. Serial No. 627,377.

*To all whom it may concern:*

Be it known that I, GEORG ARTHUR SCHLOTTER, a citizen of the German Empire, residing at Dresden, A., Kingdom of Saxony, Germany, have invented new and useful Improvements in Ship-Propellers, of which the following is a specification.

My invention relates to propellers for working in elastic or inelastic fluids, and consists in the special construction of blades, as hereafter set forth, and illustrated in the accompanying drawings, in which:—

Figure 1:
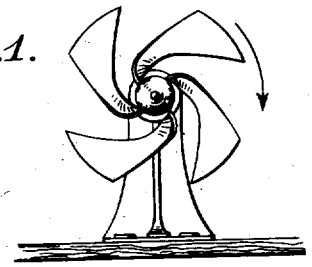
Figure 2:
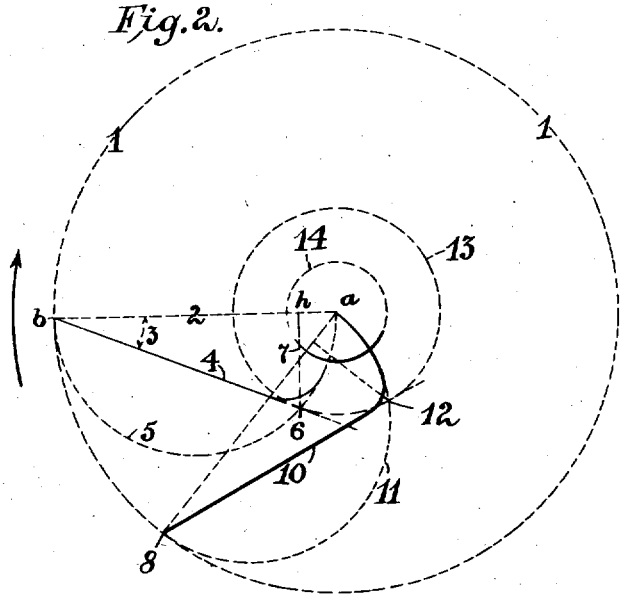
Figure 3:
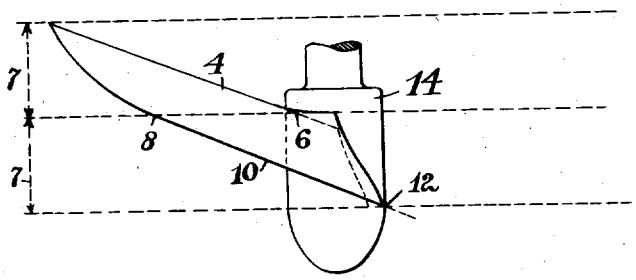

Figure 1 shows an elevation in a plane at right angles to the axis; Fig. 2 is a diagrammatic illustration of the outline of the blade and the manner in which its form is determined; Fig. 3 is a diagrammatic view of similar character in a plane parallel with the axis.

In these drawings, 1 is a circle corresponding to the outer circumference of the propeller wheel, and the line *a*—*b* a radius of the same. The direction of rotation (to the right) is indicated by the arrow in Fig. 2. An angle 3 is assumed as the required inclination of the blades and is equal to the angle of pitch of the blades. This is shown in plan in Fig. 2 and is included by the generatrix 4 and radius 2.

From the center of the radius 2 a half circle 5 is struck, and the point of intersection of the generatrix or line 4 and semicircle 5 is indicated at 6. The line *b*—6 determines the generatrix of the blade and its position. Concentric with circle 1 an inner circle 13 is struck tangential to the generatrix 4, and determining approximately the inner working extremity of the blade, the boss 14 being farther within, the root of the blade being extended to the boss through this space. It will be understood that we are dealing now with the pressure or working side of the blade, and the generatrix which determines this surface extends from the circumference of the screw, which is the outer extremity of the blade, to this inner circle 13, and lies, as assumed and shown in Fig. 1, at the forward edge of the blade, in regard to the direction of rotation.

From this position of the generatrix 4, in forming or determining the working surface of the blade, the generatrix is led always tangentially to an imaginary cylinder shown by circle 13 and spirally thereon, so that its outer end moves along an imagined cylindrical surface corresponding to circle 1, from point *b* to point 8, while its inner end moves in the same manner on the inner imaginary cylinder corresponding to circle 13 from point 6 to point 12, and thus produces what I call the helicoidal surface of the blade.

I have assumed, in the last preceding paragraph, the extreme points 8 and 12. These points determine the breadth of the blade. To establish these points, I erect upon the line *a*—*b*, from the point 6 of intersection of the generatrix 4 and semi-circle 5, a perpendicular 7, the perpendicular striking the line at *h*. The line *b*—*h* (cosine of angle 3) determines the breadth of the blade at the outer edge, that is to say, the rear point 8 is laid off on the circle 1, at a distance from point *b*, (the most advanced point of the blade) equal to the line *b*—*h*. The perpendicular 7 determines the height of the blade, that is to say, the generatrix 4 is guided spirally around the cylinder corresponding to circles 1 and 13 until it reaches the point 8 and 12 having moved an axial distance equal to the line 7. The generatrix, in the last positions 8 and 12, now determines the rear edge of the blade, and with the section of the circle 1 included between lines 4 and 10 (the initial and the terminal positions) bounds the working face of the blade.

As heretofore stated, the circle 13 indicates the inner boundary of the working parts of the blades. The roots of the blades extend from this line to the boss 14, to which they are fixed in any convenient way, as shown in Fig. 2.

In the construction above described, the generatrix was assumed to be a line of constant length, the end-points of which are placed and moved on cylinders concentrically with the axis of the propeller, the generatrix being tangential with the inner cylinder and always lying in a plane at right angles to the axis of the propeller. It will be evident that this position may be varied, and that the generatrix may lie in a plane inclined to that axis, as shown in Fig. 3, where the line 4 indicates the generatrix so inclined.

It will be obvious that the same description applies to all the blades.

I claim:

1. A propeller comprising helicoidal blades the surface of which is formed by the movement of a generatrix composed of a straight line of constant length whose end-points move on an outer and an inner cylinder concentric with the axis of the propeller, said generatrix being tangential with the inner cylinder and forming with a radius drawn from its outer end-point to the propeller axis an angle which is equal to the angle of pitch of the blades.

2. A propeller comprising helicoidal blades which are formed by the movement of a generatrix composed of a straight line of constant length, the end-points of which are placed and moved on cylinders concentric with the axis of the propeller, said blades being each bounded by a curved line which determines the circumference of the propeller and by lines which are tangential to the inner cylinder and connected at their inner ends with the hub or shaft, the generatrix making with the radius from the axis passing through the end point of the generatrix an angle which is equal to the angle of the pitch of the blades.

3. A propeller comprising helicoidal blades, each of which is formed by the movement of a generatrix, the end-points of which are placed and moved on cylinders concentric with the axis of the propeller, said blades being each bounded by a curved line which determines the circumference of the propeller and by lines which are tangential to the inner cylinder, and being joined by roots at their inner ends to the hub or shaft, the generatrix making with the radius from the axis passing through the end-point of the generatrix an angle which is equal to the angle of the pitch of the blades.

4. A propeller comprising helicoidal blades, the surface of which is formed by the movement of a generatrix formed by a line whose end points move concentric with the axis of the propeller and which in respect to the direction of rotation lags behind the radius from the propeller axis passing through the outer end point of the generatrix for an angle which is equal to the angle of the pitch of the blades.

5. A propeller comprising helicoidal blades, the surface of which is formed by the movement of a generatrix formed by a line whose end points move on an outer and an inner cylinder concentric with the axis of the propeller, said generatrix being tangential to the inner cylinder, and which is inclined to the axis of the propeller, and making with a plane passing through its outer end and vertical to the axis of the propeller, an angle which is equal to the angle of the pitch of the blades.

In testimony whereof, I have signed my name to this specification in the presence of two subscribing witnesses.

GEORG ARTHUR SCHLOTTER.

Witnesses:

OTTO WOLFF,

RICHARD IFFERTE.

Copies of this patent may be obtained for five cents each, by addressing the "Commissioner of Patents. Washington, D. C."